United States Patent
Kasahara et al.

(10) Patent No.: US 11,404,699 B2
(45) Date of Patent: Aug. 2, 2022

(54) ELECTRODE FOR SECONDARY BATTERY AND SECONDARY BATTERY USING SAME

(71) Applicants: Panasonic Corporation, Kadoma (JP); SANYO Electric Co., Ltd., Daito (JP)

(72) Inventors: Hideo Kasahara, Osaka (JP); Yuma Kamiyama, Osaka (JP); Hiromasa Yagi, Osaka (JP); Hiroyuki Tajima, Hyogo (JP)

(73) Assignees: Panasonic Holdings Corporation, Kadoma (JP); SANYO Electric Co., Ltd., Daito (JP)

( * ) Notice: Subject to any disclaimer, the term of this patent is extended or adjusted under 35 U.S.C. 154(b) by 169 days.

(21) Appl. No.: 16/757,886

(22) PCT Filed: Feb. 4, 2019

(86) PCT No.: PCT/JP2019/003831
§ 371 (c)(1),
(2) Date: Apr. 21, 2020

(87) PCT Pub. No.: WO2019/167559
PCT Pub. Date: Sep. 6, 2019

(65) Prior Publication Data
US 2021/0194013 A1 Jun. 24, 2021

(30) Foreign Application Priority Data
Feb. 28, 2018 (JP) .............................. JP2018-034767

(51) Int. Cl.
*H01M 4/70* (2006.01)
*H01M 4/02* (2006.01)
*H01M 4/13* (2010.01)

(52) U.S. Cl.
CPC ............... *H01M 4/70* (2013.01); *H01M 4/13* (2013.01)

(58) Field of Classification Search
None
See application file for complete search history.

(56) References Cited

U.S. PATENT DOCUMENTS

| | | | | |
|---|---|---|---|---|
| 2009/0263709 | A1* | 10/2009 | Nakamura | H01M 10/0418 429/152 |
| 2010/0028767 | A1 | 2/2010 | Inose et al. | |

(Continued)

FOREIGN PATENT DOCUMENTS

| JP | 2007-214038 A | 8/2007 |
|---|---|---|
| JP | 2010-34009 A | 2/2010 |

(Continued)

OTHER PUBLICATIONS

International Search Report dated May 14, 2019, issued in counterpart International Application No. PCT/JP2019/003831 (2 pages).

*Primary Examiner* — Tracy M Dove
(74) *Attorney, Agent, or Firm* — WHDA, LLP (57) ABSTRACT

An electrode for a secondary battery that includes a collector and an active material layer formed on the collector. The active material layer is configured of a plurality of layers including at least a first layer formed on the collector, and a second layer formed on the first layer. An end portion of the collector at an edge portion of the electrode is widened in an electrode thickness direction with respect to a plate thickness of the collector.

8 Claims, 4 Drawing Sheets

(56) References Cited

U.S. PATENT DOCUMENTS

| | | | |
|---|---|---|---|
| 2011/0318633 A1* | 12/2011 | Kim | H01M 4/70 |
| | | | 429/163 |
| 2019/0067670 A1* | 2/2019 | Enomoto | H01M 50/538 |
| 2019/0267608 A1 | 8/2019 | Choi et al. | |

FOREIGN PATENT DOCUMENTS

| | | |
|---|---|---|
| JP | 2017-84691 A | 5/2017 |
| JP | 2018-26274 A | 2/2018 |
| WO | 2018/004177 A1 | 1/2018 |

* cited by examiner

ELECTRODE FOR SECONDARY BATTERY AND SECONDARY BATTERY USING SAME

TECHNICAL FIELD

The present disclosure relates to an electrode for a secondary battery and a secondary battery that uses the same.

BACKGROUND ART

An electrode used in a secondary battery is formed into individual electrode sizes by, after forming active material layers on a long core body, cutting the core body into a predetermined shape. Patent Literature 1 discloses a technique of cutting a long electrode precursor into a predetermined shape using a laser. Patent Literature 1 describes about using a pulse Laser oscillator.

CITATION LIST

Patent Literature

PTL 1: Japanese Published Unexamined Patent Application No. 2010-34009

SUMMARY OF INVENTION

When an electrode, in which the thickness of an active material layer has been increased to make the secondary battery have high capacity, is cut by a pulse laser as in Patent Literature 1, falling off of the active material layers at a cut edge portion occurs easily. When an electrode body is configured using such electrodes, negative electrode plates and positive electrode plates, and the electrode body is housed in a case to form a secondary battery, there is an issue in that the active materials that have fallen off from the edge portions of the electrodes entering between the positive electrode plates and the negative electrode plates easily cause short-circuiting.

An object of the present disclosure is to provide an electrode for a secondary battery and a secondary battery that uses the electrode that is capable of suppressing falling off of the active material layer at the cut edge portion even when the active material layer constituting the electrode is multilayered.

An electrode for a secondary battery that is an aspect of the present disclosure includes a collector and an active material layer formed on the collector. The active material layer is configured of a plurality of layers including at least a first layer formed on the collector, and a second layer formed on the first layer. An end portion of the collector at an edge portion of the electrode is widened in an electrode thickness direction with respect to a plate thickness of the collector.

According to the electrode for a secondary battery and the secondary battery that uses the electrode according to the present disclosure, falling off of the active material at the cut edge portion of the electrode does not occur easily and, as a result, pieces falling off and penetrating between the positive electrode plate and the negative electrode plate causing short-circuiting can be suppressed.

DESCRIPTION OF EMBODIMENTS

Hereinafter, referring to the drawings, examples of embodiments of an electrode for a secondary battery and a manufacturing method of the electrode according to the present disclosure will be described in detail. The drawings referred to in describing the embodiments are illustrated in a schematic manner and the dimensions and the like of the components depicted in the drawings may be different from those of the actual product. Specific dimensions and the like are to be determined taking the following description into consideration. In the present description, the term "substantially" is, when explained with an example of substantially the same, intended to include not only completely the same but also those that can be considered as practically the same.

Hereinafter, while an example of an electrode for a secondary battery applied to a stacked electrode body will be described, the electrode for a secondary battery according to the present disclosure may be applied to a wound electrode body, and the manufacturing method according to the present disclosure can be applied to manufacturing an electrode for a wound electrode body.

Figure 1:
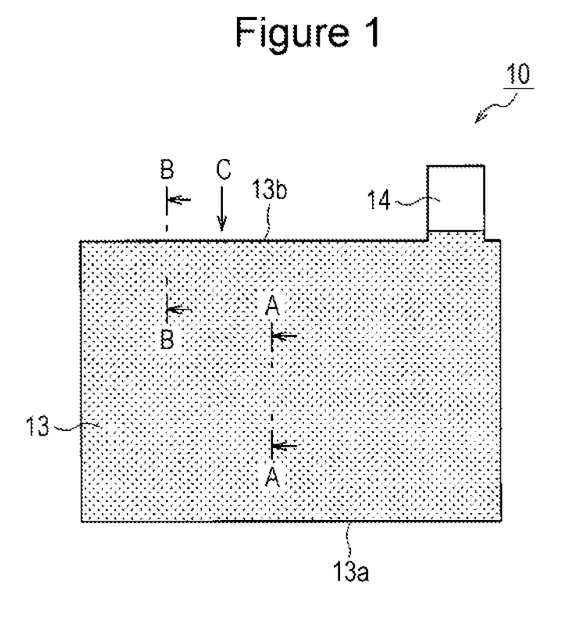
FIG. 1 A front view illustrating an electrode for a secondary battery, which is an example of an embodiment.
Figure 2:
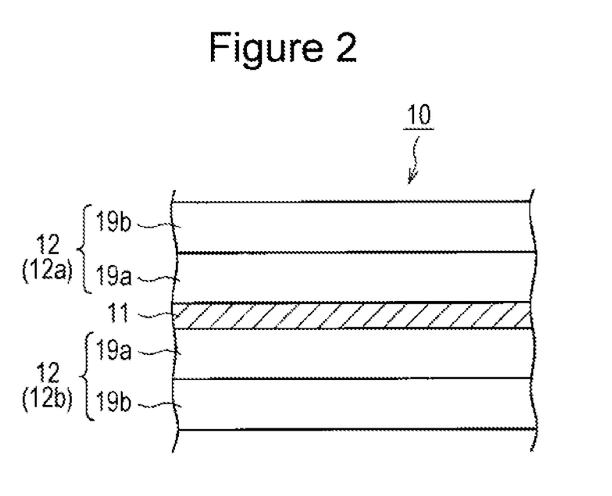
FIG. 2 An enlarged view of a cross section taken along an A-A line in FIG. 1.

FIG. 1 is a front view illustrating an electrode 10 for a secondary battery (hereinafter, appropriately referred to as merely an "electrode"), which is an example of an embodiment. As illustrated in FIGS. 1 and 2, the electrode 10 includes a thin plate-like collector 11 and an active material layer 12 formed on both surfaces of the collector 11. While the active material layer 12 may be formed only on one surface of the collector 11, desirably, the active material layer 12 is formed on both surfaces of the collector 11. Hereinafter, when the active material layers 12 formed on both sides of the collector 11 are to be distinguished, the active material layer 12 formed on one surface of the collector 11 is referred to as an active material layer 12a, and the active material layer 12 formed on the other surface of the collector 11 is referred to as an active material layer 12b.

The electrode 10 includes a base portion 13 and a lead portion 14 that protrudes from one end of the base portion 13. The base portion 13 and the lead portion 14 are integrally formed in the electrode 10. The base portion 13 is a portion where the active material layers 12 are formed, and the active material layers 12 are formed on the entirety of both surfaces of the collector 11. The base portion 13 has, in plan view, a rectangular shape long in a lateral direction. The lead portion 14 protrudes, in a long side portion of the base portion 13, from a position near the short side and has a rectangular shape in front view. Generally, the active material layers 12 are formed at the base of the lead portion 14 as well; however, the active material layers 12 are not formed in the greater part of the lead portion 14.

The base portion 13 of the electrode 10 has a rectangular shape in plan view and includes two long side portions 13a and 13b that are parallel to each other. One long side portion 13a is formed in a linear manner. As described later, the long side portion 13a can be formed by cutting (or cutting off) an electrode precursor with a continuous wave laser (CW laser). The other long side portion 13b of the base portion 13 and the lead portion 14 of the electrode 10 can also be formed by cutting the electrode precursor with the continuous wave laser.

As illustrated in FIG. 2, in the electrode 10 of the present embodiment, each active material layer 12 formed on the collector 11 is configured of a plurality of layers including at least a first layer 19a and a second layer 19b. In the above, the first layer 19a is formed in contact with a surface of the collector 11, and the second layer 19b is layered and formed on the first layer 19a. Note that the active material layer 12 may be configured of three or more plurality of layers.

The first layer 19a and the second layer 19b of the active material layer 12 are each a porous layer and are formed as layers including voids. In the present embodiment, the active material layer 12 is formed so that a void ratio of the second layer 19b is larger than that of the first layer 19a. The void ratio of each layer is calculated from the ratio of the voids in the entire observed surface after treating a cross section using a cross section polisher and with image processing.

Desirably, the active material layer 12 is formed so that density of the first layer 19a is higher than density of the second layer 19b. The density herein is "bulk density $(g/cm^3)$" that indicates the weight per unit volume including the materials constituting the first layer 19a and the second layer 19b of the active material layer 12 and the voids. Such differences in the void amount and the density between the first layer 19a and the second layer 19b can be made by differing the materials constituting the first layer 19a and the second layer 19b, for example.

The electrode 10 can be suitably used in, for example, negative electrode plates constituting an electrode body of a lithium ion battery that is an example of the secondary battery. The electrode body is configured by stacking and integrating a number of positive electrode plates and negative electrode plates with a separator in between each of the positive electrode plate and the negative electrode plate.

The positive electrode plates, the negative electrode plates, and the separators constituting the electrode body of the lithium ion battery will be described next. The positive electrode plate is configured by forming a positive electrode active material layer on both surfaces of a foil-like positive electrode core body. The positive electrode core body is formed of aluminum or aluminum alloy foil, for example. The positive electrode lead portion is formed by the positive electrode core body itself on which no positive electrode active material layer is formed.

The positive electrode active material layer can be fabricated by, for example, using lithium nickel oxide as the positive electrode active material, using acetylene black (AB) as a conductive agent, using polyvinylidene fluoride (PVDF) as a binding agent, and using N-methyl-2-pyrrolidone as a dispersion medium. Describing the positive electrode active material in further detail, any chemical compound that can reversibly absorb/release lithium ion can be appropriately selected and used as the positive electrode active material. Lithium transition metal composite oxide is desirable for the positive electrode active material. For example, a lithium transition metal composite oxide expressed as $LiMo_2$ (note that M is at least one of Co, Ni, and Mn) that is capable of reversibly absorbing/releasing lithium ion, in other words, one of or a mixture of a plurality of $LiCoO_2$, $LiNiO_2$, $LiNi_yCo_{1-y}O_2$ (y=0.01–0.99), $LiMnO_2$, $LiCo_xMn_yNi_zO_2$ (x+y+z=1), and $LiMn_2O_4$ or $LiFePO_4$ can be used. Moreover, lithium cobalt composite oxide to which a dissimilar metal element such as zirconium, magnesium, aluminum, or tungsten is added can be used as well. However, the positive electrode active material layer may be fabricated with any other known materials.

The positive electrode plate is fabricated in the following manner, for example. A conductive agent, a binding agent, and the like are mixed with the positive electrode active material, and the above mixture is kneaded and mixed inside a dispersion medium to fabricate paste-like positive electrode active material slurry. After the above, the positive electrode active material slurry is coated on the positive electrode core body. Subsequently, the positive electrode active material slurry coated on the positive electrode core body is dried and compressed to form a positive electrode active material layer. Subsequently, the positive electrode core body and the positive electrode active material layer are cut by laser fusion cutting and the like, for example, to form the positive electrode plate including the positive electrode lead portion.

The negative electrode plate is configured by forming a negative electrode active material layer on both surfaces of a foil-like negative electrode core body. The negative electrode core body is formed of copper or copper alloy foil, for example. The negative electrode lead portion is formed by the positive electrode core body itself on which no negative electrode active material layer is formed.

The negative electrode active material of the negative electrode active material layer is not limited to any particular material as long as lithium can be reversibly absorbed/released and, for example, a carbon material, a silicon material, lithium metal, metal or an alloy material that becomes alloyed with lithium, metal oxide, or the like can be used. For example, Si, $SiO_x$ (x=0.5–1.5) can be used as the silicon material. For example, natural graphite, artificial graphite, mesophase-pitch-based carbon fiber (MCF), mesocarbon microbeads (MCMB), coke, hard carbon, or the like can be used as the carbon material. The negative electrode active material of the negative electrode active material layer in the first layer 19a and that in the second layer 19b may be different. A case in which the first layer 19a contains a silicon material and a carbon material, and the second layer 19b formed of a carbon material alone is exemplified.

Furthermore, desirably, the negative electrode active material layer is fabricated by using styrene-butadiene copolymer rubber particle dispersion (SBR) as the binding agent, using carboxymethyl-cellulose (CMC) as a thickener, and using water as the dispersion medium. The negative electrode active material layer is fabricated in the following manner, for example. A conductive agent, a binding agent, and the like are mixed with the negative electrode active material, and the above mixture is kneaded and mixed inside a dispersion medium to fabricate paste-like negative electrode active material slurry. After the above, the negative electrode active material slurry is coated on the negative electrode core body. Subsequently, when the negative electrode active material slurry coated on the negative electrode core body is dried and compressed, a negative electrode active material layer is formed. Subsequently, the negative electrode core body and the negative electrode active material layer are cut by laser fusion cutting and the like, for example, to form the negative electrode plate including the negative electrode lead portion.

A known separator that is generally used in a nonaqueous electrolyte secondary battery can be used as the separator. For example, a separator formed of polyolefin is desirable. Specifically, not only a separator formed of polyethylene, a separator in which a layer of polypropylene is formed on surfaces of polyethylene, or a separator in which an aramid resin is coated on surfaces of a polyethylene separator may be used.

An inorganic filler layer may be formed at a boundary between each positive electrode plate and the corresponding separator or at a boundary between each negative electrode plate and the corresponding separator. As the filler, a filler formed of an oxide or a phosphate compound that uses one or some of titanium, aluminum, silicon, magnesium, and the like, or a filler in which hydroxide is treated on the surfaces of the oxide or the phosphate compound may be used. Furthermore, the filler layer may be formed by directly coating a filler containing slurry on the positive electrode plate, the negative electrode plate, or the separator, or may be formed by adhering a sheet formed of filler to the positive electrode plate, the negative electrode plate, or the separator.

Figure 3:
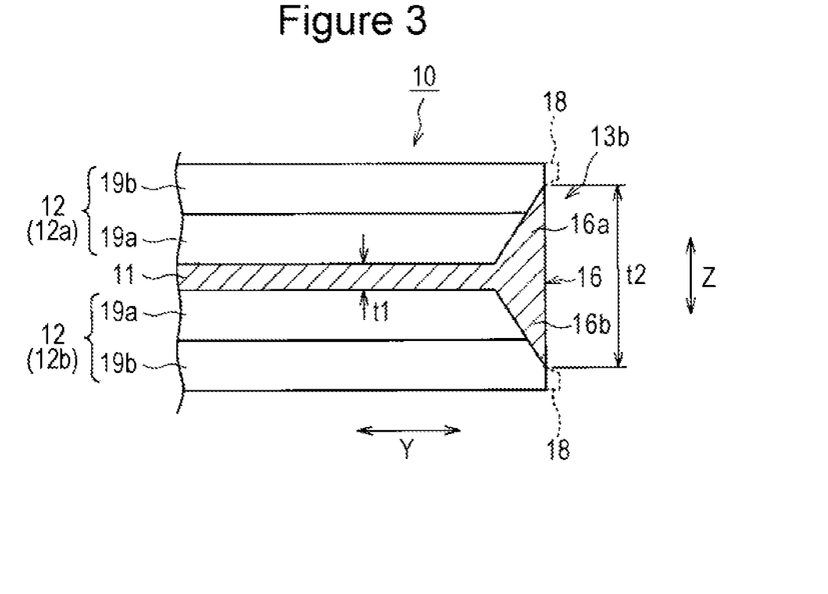
FIG. 3 An enlarged view of a cross section taken along a B-B line in FIG. 1.

FIG. 3 is an enlarged view of a cross section taken along a B-B line in FIG. 1. FIG. 3 illustrates an enlarged cross section of the long side portion 13$b$ in the electrode 10 in which the lead portion 14 is provided. Furthermore, in FIG. 3, a surface direction along a surface of the electrode 10 is depicted by an arrow Y, and a thickness direction of the electrode 10 that is a direction at a right angle against the surface direction is depicted by an arrow Z.

As described later, the long side portion 13$b$ of the electrode 10 is an edge portion that is cut by laser fusion cutting the electrode precursor. An end portion of the collector 11 at the edge portion is, with respect to a plate thickness of the collector 11, widened in an electrode thickness direction. Specifically, t1<t2 holds true, where t1 is a plate plate of the collector 11, and t2 is a dimension of the collector 11 in the electrode thickness direction.

In FIG. 3, an example in which an end portion 16 of the collector 11 is formed so as to be widened in a substantially triangular shape is schematically illustrated. However, in actuality, the end portion 16 of the collector 11 does not have to be formed so as to be widened in the substantially triangular shape as long as the end portion 16 is shaped so that the dimension t2 in the electrode thickness direction is larger than the plate thickness t1. Specifically, the cross-sectional shape of the end portion 16 of the collector 11 may be a substantially trapezoidal shape or may be a substantially rectangular shape long in the electrode thickness direction.

The portion in the end portion 16 of the collector 11 that is widened with respect to the plate thickness t1 covers the first layer 19$a$ and the second layer 19$b$ of each active material layer 12 formed on both sides of the collector 11. More specifically, portions 16$a$ and 16$b$ in the end portion 16 of the collector 11 widened with respect to the plate thickness t1 each cover the entire end portion of the first layer 19$a$ of the corresponding active material layer 12. Furthermore, each of the portions 16$a$ and 16$b$ in the end portion 16 of the collector 11 widened with respect to the plate thickness t1 covers a portion of an end portion of the second layer 19$b$ of the corresponding active material layer 12. As described above, by forming the widened portions 16$a$ and 16$b$ of the collector 11 to be in a state covering the portions of the end portions of the second layers 19$b$, the widened portions of the collector 11 are formed so as not to be formed to transcend the surfaces (in other words, the surfaces of the second layers 19$b$) of the active material layers 12 of the electrode 10. With the above, short-circuiting with an adjacent electrode with a different polarity (the positive electrode plate, for example) that is likely to occur when the widened portions 16$a$ and 16$b$ of the collector 11 are formed so as to transcend the surfaces of the active material layers 12 of the electrode 10 can be suppressed.

As described above, the reason why the end portion 16 of the collector 11 is formed in a shape that is widened with respect to the plate thickness t1 is assumed as below. When laser fusion cutting is performed on the collector 11, the molten state of the collector 11 formed of a high heat-conductive metal foil instantaneously spreads in the surface direction Y because of the high laser output (for example, 1000 W to 3000 W). The melted metal forming the end portion 16 of the collector 11 tries to become rounded due to the effect of surface tension and the like. However, due to the existence of the active material layer 12 on both surfaces of the collector 11, the melted metal is prevented from becoming completely round. It is assumed that as a result of the above, in the end portion 16 of the collector 11, the widened portions 16$a$ and 16$b$ having a substantially triangular shape are formed on both sides of the collector 11 in the thickness direction Z. As described above, by including the widened portions 16$a$ and 16$b$ in the end portion 16 of the collector 11, the active material layers 12 are restrained at the edge portion of the electrode 10 and are suppressed from falling off from the collector 11.

Note that in FIG. 3, an end surface of the end portion 16 of the collector 11 is formed flush with the end portions of the second layers 19$b$ of the active material layers 12 in the surface direction Y; however, the embodiment is not limited to the above. As illustrated by broken lines in FIG. 3, melted and solidified portions 18, which are solidified active materials that have been melted during the laser fusion cutting, may be formed at the end portions of the second layers 19$b$ of the active material layers 12. The melted and solidified portions 18 may be formed so as to protrude towards the outer side in the surface direction Y with respect to the end surface of the end portion 16 of the collector 11. In other words, the end surface of the end portion 16 of the collector 11 may be formed on the inner side in the surface direction Y with respect to the melted and solidified portions 18 of the second layers 19$b$ of the active material layers 12. That is, in such a case, the end surface of the end portion 16 of the collector 11 is at a recessed position in the surface direction Y with respect to the melted and solidified portions 18 of the second layers 19$b$. By forming the end surface of the end portion 16 of the collector 11 in a recessed manner, short-circuiting with the adjacent electrode with a different polarity (the positive electrode plate, for example) can be made to be more unlikely to occur.

As described above, the first layer 19$a$ and the second layer 19$b$ of the active material layer 12 are each a porous layer and are formed as layers including voids. Accordingly, a portion of the material of the collector 11 that has been melted when the widened portions 16$a$ and 16$b$ of the end portion 16 of the collector 11 are formed penetrate in the voids described above. In other words, the portions 16$a$ and 16$b$ that are widened in a substantially triangular shape in FIG. 3 are formed so that the melted collector material penetrates in the voids of the first layer 19$a$ and the second layer 19$b$. By having the melted material of the collector 11 penetrate and solidify in the voids of the end portions of the first layer 19$a$ and the second layer 19$b$ of each active material layer 12, falling off of the end portions of the first layer 19$a$ and the second layer 19$b$ of each active material layer 12 can be suppressed in an effective manner.

Furthermore, in the present embodiment, the active material layer 12 is formed so that the void ratio of the second layer 19b is higher than that of the first layer 19a. Accordingly, more material of the collector 11, which has been melted when the widened portions 16a and 16b of the end portion 16 of the collector 11 are formed, penetrates in the voids of the second layer 19b than in the voids of the first layer 19a. By having more material of the collector 11 melted in the above manner penetrate and solidify in the voids of the end portions of the second layers 19b of the active material layers 12, falling off of the end portions of the second layers 19b of the active material layers 12 can be suppressed in a further effective manner.

In FIGS. 2 and 3, while an interface between each first layer 19a and the corresponding second layer 19b is clearly depicted, each interface does not have to be clear. For example, a layer in which the first layer 19a and the second layer 19b coexist can be present.

Figure 4:
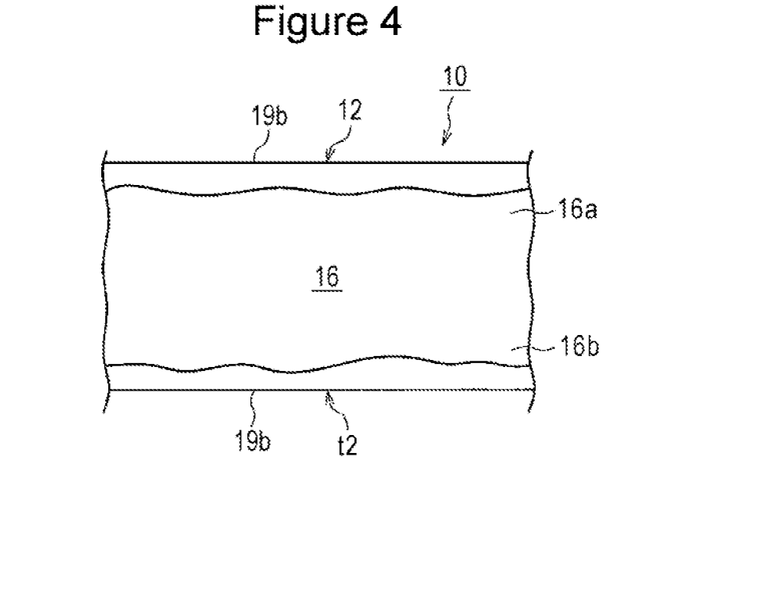
FIG. 4 An enlarged view of a cut edge portion of an electrode viewed from a C-direction in FIG. 1.

FIG. 4 is an enlarged view of the edge portion of the electrode 10 viewed from a C-direction in FIG. 1. As illustrated in FIG. 4, in the edge portion of the electrode 10, edges of the portions 16a and 16b formed so as to widen with respect to the plate thickness t1 are formed in a wavelike shape. As described above, it is desirable that the widened portions 16a and 16b of the collector 11 having wavelike-shaped edges are formed so as not to transcend the surfaces of the second layers 19b of the active material layers 12.

Figure 5:
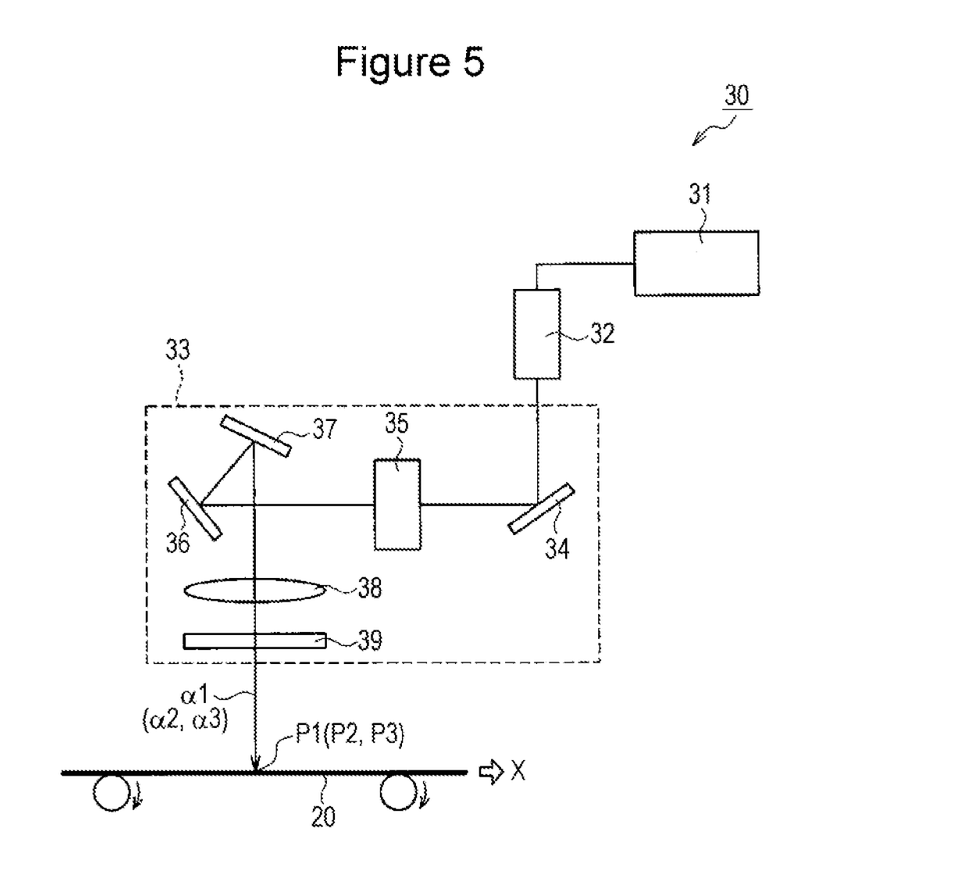
FIG. 5 A diagram for describing a continuous wave laser used in cutting and forming the electrode for a secondary battery illustrated in FIG. 1.
Figure 6:
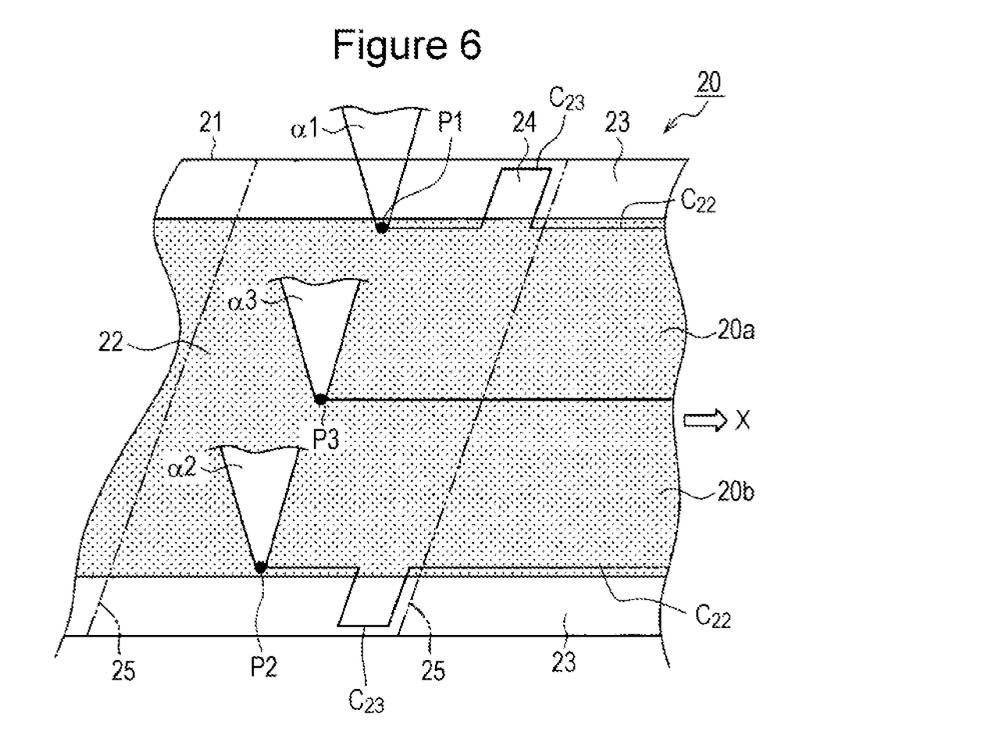
FIG. 6 A perspective view illustrating a state in which the electrode for a secondary battery illustrated in FIG. 1 is cut with the continuous wave laser.

Referring next to FIGS. 5 and 6, an example of a manufacturing method of the electrode 10 will be described in detail. FIG. 5 illustrates an overall configuration of a laser system 30 used in manufacturing the electrode 10 of the embodiment. FIG. 6 illustrates a state in which an electrode precursor 20 is cut by a laser beam $\alpha$ output from the laser system 30. Herein, a member that becomes the collector 11 of the electrode 10 by cutting the electrode precursor 20 is a long core body 21, and a layer that becomes the active material layer 12 is an active material layer 22. Furthermore, in FIGS. 5 and 6, a moving direction of the electrode precursor 20 relative to an irradiation position of the laser beam $\alpha$ is depicted by an arrow X.

As illustrated in FIGS. 5 and 6, the electrode 10 is manufactured by cutting a long electrode precursor 20, in which an active material layer 22 is formed on both surfaces of the long core body 21, into a predetermined shape. In the electrode precursor 20 of the present embodiment, the active material layer 22 is formed on both surfaces of the long core body 21. In the active material layer 22, mixture slurry containing constituent materials of the active material and the like is prepared. In so doing, mixture slurry for the first layer 19a that constitutes the active material layer 12, and mixture slurry for the second layer 19b are prepared separately. Subsequently, each mixture slurry is coated, one on top of each other, on both surfaces of the long core body 21, and the active material layers 22 are formed by drying the coating films.

In a step in which the active material layer 22 is formed, exposed portions 23 in which the surface of the core body are exposed in a longitudinal direction of the electrode precursor 20 are formed. Desirably, the exposed portion 23 is formed at a substantially uniform width from both ends of the long core body 21 in a width direction. While the exposed portions 23 may be formed by peeling and removing portions of the active material layer 22 after the active material layer 22 is formed on the entire area of both surfaces of the long core body 21, desirably, the exposed portions 23 are formed by not coating the mixture slurry on portions of the long core body 21.

As illustrated in FIG. 6, the long core body 21 has a width in which two electrodes 10 can be formed in the width direction, which is a direction that is orthogonal to the longitudinal direction. Accordingly, in the laser system 30 of the present embodiment, three laser beams $\alpha 1$, $\alpha 2$, and $\alpha 3$ are used to cut the electrode precursor 20. More specifically, both end sides of the electrode precursor 20 in the width direction are irradiated with the laser beams $\alpha 1$ and $\alpha 2$ to form the long side portions 13b, including the lead portions 14, in the base portion 13 of the electrode 10. The center of the electrode precursor 20 in the width direction is irradiated with the laser beam $\alpha 3$ to cut the electrode precursor 20 into two electrode intermediary bodies 20a and 20b.

In the step of cutting the electrode precursor 20, the electrode precursor 20 is irradiated with the laser beams $\alpha 1$, $\alpha 2$, and $\alpha 3$ while the position of the electrode precursor 20 relative to a machining head of the laser system 30 is changed. It is possible to scan the laser beams $\alpha 1$, $\alpha 2$, and $\alpha 3$ while the electrode precursor 20 is fixed; however, when processing a long electrode precursor 20, desirably, the electrode precursor 20 is cut while being conveyed. The laser beams $\alpha 1$, $\alpha 2$, and $\alpha 3$ may be scanned while the electrode precursor 20 is conveyed.

FIG. 5 illustrates, as an example, the laser system 30 that outputs a laser beam $\alpha 1$ with which one end side of the electrode precursor 20 in the width direction is irradiated. A laser system that outputs laser beams $\alpha 2$ and $\alpha 3$ can be configured in a similar manner.

As illustrated in FIG. 5, the laser system 30 includes a laser oscillator 31 and a machining head built in with a galvanoscanner 33. By using the galvanoscanner 33, the laser beam $\alpha 1$ can be scanned while the machining head itself is in a fixed state. The laser oscillator 31 is an oscillator that is capable of continuous oscillations. Examples of the laser oscillator 31 include a YAG laser, a CO2 laser, an Ar laser, a fiber laser, and the like that are capable of outputting the laser beam +1 in a continuous oscillation mode. The fiber laser is a suitable example. An example of a suitable range of the oscillation wavelength is 900 nm to 1200 nm. In the laser system 30, a collimator 32 that forms the laser beam $\alpha 1$ output from the laser oscillator 31 into a parallel beam is provided between the laser oscillator 31 and the galvanoscanner 33.

The galvanoscanner 33 includes, in order from the laser oscillator 31 side, a reflecting mirror 34, an optical element 35, an X-axis mirror 36, a Y-axis mirror 37, and an F$\theta$ lens 38. For example, a diffraction grating and the like are used as the optical element 35. The laser beam +1 that is a continuous wave that has passed through the collimator 32 is bent towards an optical element 35 side with the reflecting mirror 34, passes through the optical element 35, and is guided to the X-axis mirror 36 and the Y-axis mirror 37. The laser beam +1 is scanned by moving the X-axis mirror 36 and the Y-axis mirror 37, and a position of an irradiation spot P1 can be changed inside a two-dimensional surface. The laser beam $\alpha 1$ reflected by the X-axis mirror 36 and the Y-axis mirror 37 passes through the F$\theta$ lens 38 and a protective glass 39, and the electrode precursor 20 is irradiated with the laser beam $\alpha 1$.

The laser irradiation conditions are, desirably, adjusted based on the material, the thickness, the cutting shape, and the like of the long core body 21 and those of the active material layer 22; however, generally, the output of the continuous wave laser (laser oscillator 31) is 500 W to 5000 W, and a spot diameter of the laser beam $\alpha 1$ is 5 μm to 100

μm. Furthermore, the speed at which the continuous wave laser cuts the electrode precursor 20 is 500 mm/sec to 8000 mm/sec, for example. Irradiation conditions may be changed between when the electrode precursor 20 is a precursor of a negative electrode plate and when the electrode precursor 20 is a precursor of a positive electrode plate. Generally, cutting of the precursor of the positive electrode plate is easier.

Examples of preferable ranges related to the laser output, the spot diameter, and the cutting speed are as follows. The laser output is more preferably 1000 W to 3000 W. The spot diameter is preferably 10 μm to 100 μm, and more preferably is 10 μm to 40 μm. The cutting speed is more preferably 1000 mm/sec to 5000 mm/sec.

Note that each of the outputs of the laser beams α1, α2, and α3 irradiating the electrode precursor 20 can be set to have the same output. Note that the laser beams α1 and α2 irradiating both end sides of the electrode precursor 20 in the width direction include the areas where only the exposed portions 23 of the collector 11 are cut (in other words, outlines of protruded portions 24 that become the lead portions 14). Compared with the area where the active material layer 22 exists, the exposed portions 23 can be cut even when the output of the laser beam is low. When the laser output is excessive, the peripheral portions of the protruded portions 24 that become the lead portions 14 may be formed with rough cutting surfaces. Accordingly, the outputs of the laser beams α1 and α2 may be set low compared with the output of the laser beam α3 that cuts only the area where the active material layers 22 are present.

As illustrated as an example in FIG. 6, in the step of cutting the electrode precursor 20, by using the continuous wave laser, the protruded portions 24 that become the lead portions 14 are formed by cutting the portion along the exposed portion 23 where the active material layer 22 of the electrode precursor 20 is provided, and by changing the cutting direction and cutting the exposed portion 23 at substantially constant periods. While positions of boundaries, which are between the portion where the active material layer 22 is provided and the exposed portions 23, can be irradiated with the laser beams α1 and α2, in such a case, with a slight deviation of the irradiation spots P1 and P2, surfaces in which the collector 11 is exposed are formed in portions other than the lead portion 14. The surfaces in the portions other than the lead portions 14 in which the collector 11 is exposed may cause a low-resistance short-circuiting between the positive and negative electrodes; accordingly, it is desirable that cutting of the electrode precursor 20 is performed so that the above exposed portion is not formed, particularly, in the positive electrode. Accordingly, the electrode precursor 20 is, desirably, cut by irradiating the portions of the active material layer 22 at the vicinities of the exposed portions 23 with the laser beams α1 and α2.

Each of the laser beams α1 and α2 is scanned along the corresponding exposed portion 23 (the longitudinal direction of the electrode precursor 20) and is scanned towards the corresponding exposed portion 23 side (the width direction of the electrode precursor 20) at a portion corresponding to the corresponding protruded portion 24. In so doing, the laser beam α1 and the laser beam α2 are scanned in opposite directions. Since the positions of the boundaries, which are between the portion where the active material layer 22 is provided and the exposed portions 23, are irradiated with the laser beams α1 and α2 in a continuous manner, cut portions C22 in the portions where the active material layer 22 is provided and the cut portions C23 of the exposed portions 23 are formed in a continuous line-shaped manner. By cutting the exposed portions 23 by changing the cutting directions at substantially constant periods, a plurality of protruded portions 24 that are aligned at substantially equal distances in the longitudinal direction of the electrode precursor 20 are formed. Subsequently, the electrodes 10 each including the base portion 13 in which the active material layer 12 is formed in its entirety, and a lead portion 14 in which the active material layer 12 is formed at its base are obtained.

In the present embodiment, the electrode precursor 20 is cut into the size of the electrode using the continuous wave laser. As described above, since the long core body 21 has a width that allows two electrodes 10 to be formed in the width direction, the center of the electrode precursor 20 in the width direction is irradiated with the laser beam α3 to cut in the longitudinal direction of the electrode precursor 20. With the above, two long electrode intermediary bodies 20a and 20b each cut at a width corresponding to the electrode 10 are obtained. Note that since the electrode precursor 20 is cut in a linear manner at the center in the width direction with the laser beam α3, it is only sufficient that the laser beam α3 can be one-dimensionally scanned. Accordingly, in the laser system that outputs the laser beam α3, for example, the Y-axis mirror 37 may be omitted or the Y-axis mirror 37 may be fixed.

The electrode intermediary bodies 20a and 20b that have been, as described above, separated into two using the continuous wave laser can be supplied to a step of compressing the active material layer 22. After the compression step, the electrode intermediary bodies 20a and 20b are cut along projected cut lines 25 to obtain the individual electrodes 10. The cutting into the individual electrodes 10 can be performed using the continuous wave laser or may be performed using a typical and known cutting method that uses a cutter or the like.

Note that in FIG. 6, an example in which the irradiation of the three laser beams α1, α2, and α3 are performed while the three laser beams α1, α2, and α3 are aligned in the width direction of the electrode precursor 20 has been described; however, not limited to the above, at least one of the irradiation positions of the laser beams α1, α2, and α3 can be shifted in the direction (arrow X) in which the electrode precursor 20 is moved.

Figure 7:
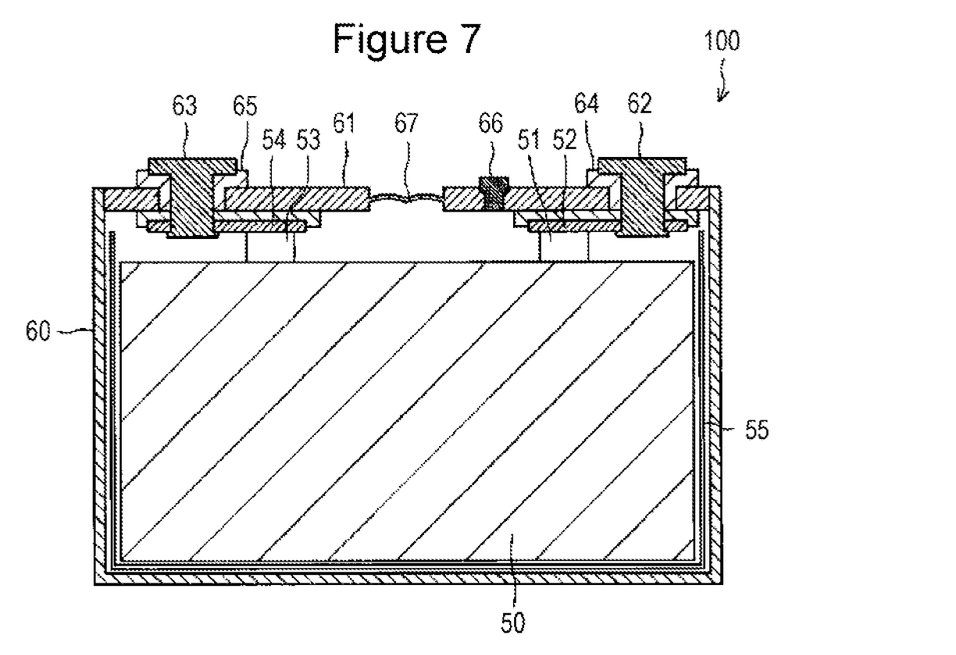
FIG. 7 A cross-sectional view of a secondary battery that is an example of an embodiment.

Referring next to FIG. 7, a configuration of a secondary battery 100 using the electrodes 10 will be described.

As illustrated in FIG. 7, in the secondary battery 100, an electrode body 50 in which a plurality of positive electrodes and a plurality of negative electrodes are each alternately stacked on each other with a separator in between is housed inside a battery case 60 together with an electrolyte (not shown). Note that the electrodes 10 can be used as the negative electrode electrodes constituting the electrode body 50. Furthermore, the electrodes of the present embodiment can be used as the positive electrode plates constituting the electrode body 50.

An opening portion of the battery case 60 is sealed with a sealing body 61. A positive electrode terminal 62 and a negative electrode terminal 63 are each fixed to the sealing body 61 through a corresponding one of resin members 64 and 65. The positive electrode plates are electrically connected to the positive electrode terminal 62 through positive electrode lead portions 51 and a positive electrode collector member 52. The negative electrode is electrically connected to the negative electrode terminal 63 through negative electrode lead portions 53 and a negative electrode collector member 54. An injection hole through which the electrolyte is injected is provided in the sealing body 61. After injecting the electrolyte, the injection hole is sealed with a sealing member 66. Furthermore, a gas discharge valve 67 that releases pressure when the pressure inside the battery case 60 rises is provided in the sealing body 61. When the battery case 60 is formed of metal, desirably, the electrode body 50 is disposed in the battery case 60 while being disposed inside a box-shaped or a bag-shaped insulating sheet 55.

Note that the positive electrode lead portion 51 protruding from each positive electrode, desirably, is in a bent state and is, in the positive electrode collector member 52, connected to a portion disposed substantially parallel to the sealing body 61. Furthermore, the negative electrode lead portion 53 protruding from each negative electrode, desirably, is in a bent state and is, in the negative electrode collector member 54, connected to a portion disposed substantially parallel to the sealing body 61. With the above, the secondary battery can be one with a higher volume energy density.

Furthermore, the positive electrode plates and the negative electrode plates that constitute the electrode body 50 are, desirably, adhered to each other by a separator disposed between each positive electrode plate and the corresponding negative electrode plate. As art adhering method, desirably, an adhesive layer is provided on a surface of each separator formed of polypropylene, polyethylene, or the like, of polyolefin or the like, or on a surface of each electrode active material layer so that the adhesive layer adheres each separator and the corresponding active material layer to each other. Adhesion is, desirably, pressure bonding, thermal welding, or the like. While the adhesive layer is not limited to any layer in particular, the adhesive layer is, desirably, a layer that is softer than the separator. Furthermore, as the adhesive layer, an adhesive layer formed of resin is desirable, and polyvinylidene fluoride, carboxymethyl-cellulose, polyvinyl alcohol, or the like can be used.

When each active material layer and the corresponding separator are adhered to each other with an adhesive layer, desirably, the adhesive layer is in contact with the melted and solidified portions of the active material layer 12. With the above, the melted and solidified portions can be prevented from slipping off from the active material layer when the secondary battery is used.

Note that the electrode for a secondary battery and the secondary battery using the electrode according to the present disclosure is not limited to the embodiments and the modifications described above and various changes and modifications can be made within the scope of the items described in the claims of the present application.

REFERENCE SIGNS LIST

10 electrode
11 collector
12, 12a, 12b, 22 active material layer
13 base portion
13a, 13b long side portion
14 lead portion
16 end portion
16a, 16b widened portion of collector
18 melted and solidified portion
19a first layer
19b second layer
20 electrode precursor
20a, 20b electrode intermediary body
21 long core body
23 exposed portion
24 protruded portion
25 projected cut line
30 laser system
31 laser oscillator
32 collimator
33 galvanoscanner
34 reflecting mirror
35 optical element
36 X-axis mirror
37 Y-axis mirror
38 Fθ lens
39 protective glass
50 electrode body
51 positive electrode lead portion
52 positive electrode collector member
53 negative electrode lead portion
54 negative electrode collector member
55 insulating sheet
60 battery case
61 sealing body
62 positive electrode terminal
63 negative electrode terminal
64, 65 resin member
66 sealing member
67 gas discharge valve
100 secondary battery
C22, C23 cut portion
P1, P2, P3 irradiation spot
t1 plate thickness
t2 dimension
$\alpha 1$, $\alpha 2$, $\alpha 3$ laser beam

The invention claimed is:

1. An electrode for a secondary battery, comprising:
   a collector, and an active material layer formed on the collector, wherein
   the active material layer is configured of a plurality of layers including at least a first layer formed on the collector, and a second layer formed on the first layer, and
   an end portion of the collector at an edge portion of the electrode is widened in an electrode thickness direction with respect to a plate thickness of the collector,
   wherein at the edge portion of the electrode, a widened portion at the end portion of the collector covers an end portion of the first layer of the active material layer and covers at least a portion of an end portion of the second layer.

2. The electrode for the secondary battery according to claim 1, wherein the first layer and the second layer of the active material layer include voids, and a collector material penetrates in the voids in the widened portion at the end portion of the collector.

3. The electrode for the secondary battery according to claim 2, wherein the first layer and the second layer of the active material layer include the voids, and the widened portion at the end portion of the collector comprises a portion within the respective voids of the first layer and the second layer, said portion including a previously melted portion of the collector material.

4. The electrode for the secondary battery according to claim 3, wherein a void ratio of the second layer is higher than a void ratio of the first layer, and an amount of the collector material within the voids of the second layer is larger than an amount of the collector material within the voids of the first layer.

5. The electrode for the secondary battery according to claim 1, wherein in the active material layer, density of the first layer is higher than density of the second layer.

6. The electrode for the secondary battery according to claim 1, wherein an edge of the widened portion at the end portion of the collector is formed in a wavelike shape.

7. The electrode for the secondary battery according to claim 1,
   wherein a melted and solidified portion that is a melted and solidified active material protrudes outward from the edge portion of the electrode in a direction perpendicular to the electrode thickness direction, and
   wherein an end surface of the widened portion at the end portion of the collector is positioned inward from the melted and solidified portion in the direction perpendicular to the electrode thickness direction.

8. The secondary battery that comprises the electrode according to claim 1.

* * * * *